United States Patent [19]

Le Brise

[11] 4,234,068
[45] Nov. 18, 1980

[54] TORSION DAMPING ASSEMBLY ESPECIALLY FOR A FRICTION CLUTCH PLATE ASSEMBLY

[75] Inventor: Raymond Le Brise, Montmorency, France

[73] Assignee: Societe Anonyme Francaise du Ferodo, France

[21] Appl. No.: 826,958

[22] Filed: Aug. 22, 1977

[30] Foreign Application Priority Data

Aug. 25, 1976 [FR] France .................. 76 25666

[51] Int. Cl.³ .................................................. F16D 3/66
[52] U.S. Cl. ........................................................ 192/106.2
[58] Field of Search ............. 192/106.1, 106.2, 107 M, 192/107 R; 64/27 F; 188/250 G, 218 XL

[56] References Cited

U.S. PATENT DOCUMENTS

| | | | |
|---|---|---|---|
| 2,316,820 | 4/1943 | Thelander | 192/106.2 |
| 2,826,902 | 3/1958 | De Coursey | 192/106.2 |
| 2,986,252 | 5/1961 | Du Bois | 192/107 M |
| 3,027,979 | 4/1962 | Pocock | 192/107 M |
| 3,114,197 | 12/1963 | Du Bois et al. | 192/107 M |
| 3,578,121 | 5/1971 | Maurice | 192/106.2 |

FOREIGN PATENT DOCUMENTS

| | | | |
|---|---|---|---|
| 2258543 | 7/1973 | Fed. Rep. of Germany | 192/106.2 |
| 2508878 | 10/1975 | Fed. Rep. of Germany | 192/106.2 |
| 2242606 | 3/1975 | France | 192/106.2 |
| 1428557 | 3/1976 | United Kingdom | 192/106.2 |

*Primary Examiner*—George H. Krizmanich
*Attorney, Agent, or Firm*—Charles E. Brown

[57] ABSTRACT

A flexible center type friction clutch plate including a pair of identical annular guiding plates and a hub with a radially outwardly extending web intermediate thereof. Passages are provided along the periphery of both of the annular guiding plates. The passages in one of the annular guiding plates serve to mount the friction disc secured thereto by rivets. The passages in the other annular guiding plate which hitherto were left unused serve to mount friction shoes which enhance the "hysteresis" effect complementing that provided by the friction washers between the web and one of the annular guiding plates. By choosing the number of friction shoes in the passages the precise hysteresis effect may be achieved.

12 Claims, 8 Drawing Figures

U.S. Patent  Nov. 18, 1980  4,234,068
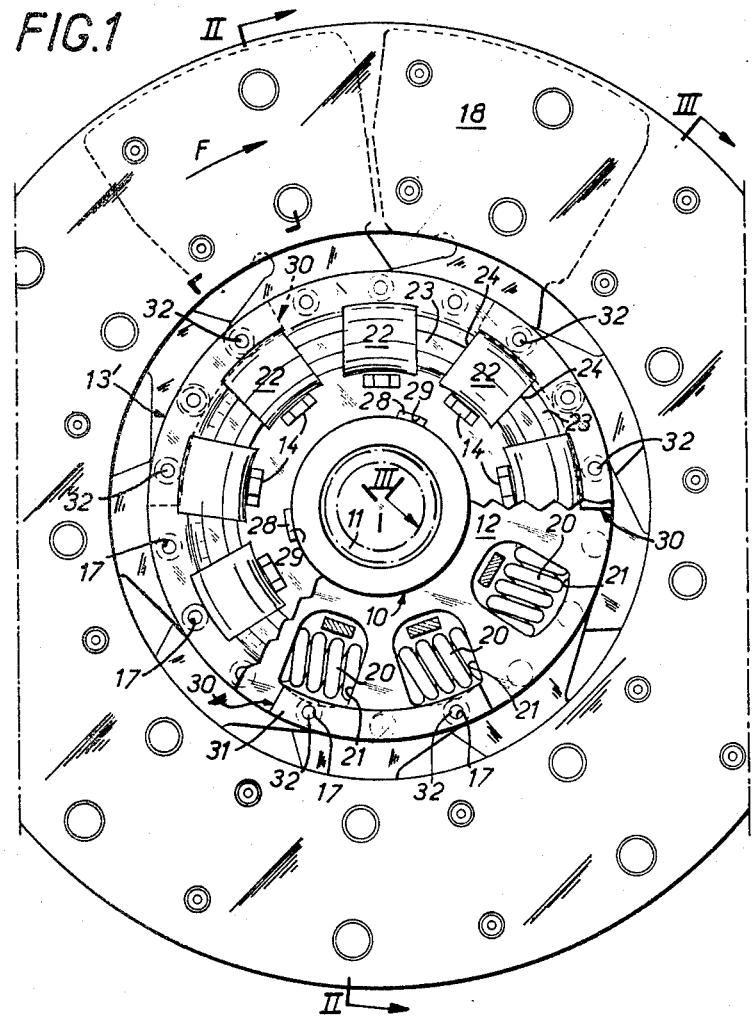
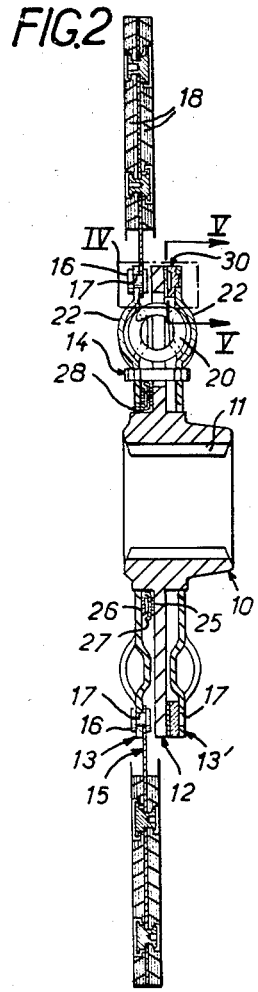
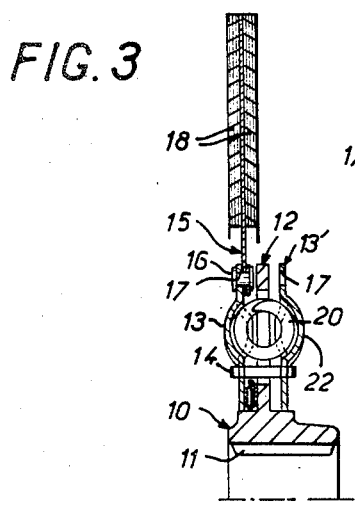
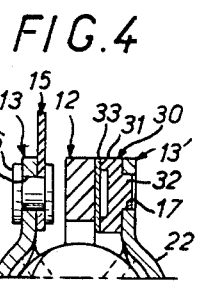
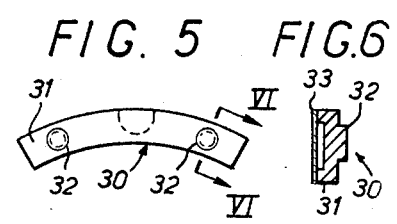
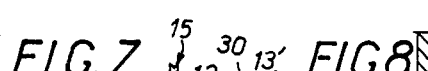
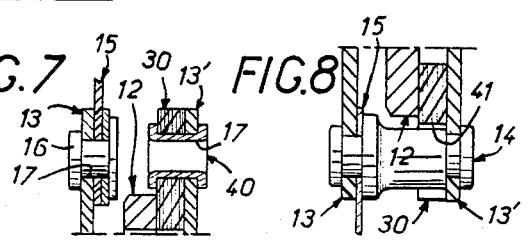

TORSION DAMPING ASSEMBLY ESPECIALLY FOR A FRICTION CLUTCH PLATE ASSEMBLY

BACKGROUND OF THE INVENTION

The present invention relates generally to torsion damping assemblies comprising two coaxial parts mounted for rotation relative to each other for limited angular displacement, that is, one part having a web and another part including two annular guiding plates, one guiding plate disposed on each side of the web and cross members interconnecting the plates and parallel to the axis of the assembly and a circumferential array of resilient means interposed between the rotatable coaxial parts.

The present invention relates more particularly though not exclusively to torsion damping assemblies of the foregoing construction for friction clutch plate assemblies having so-called flexible centers, namely for motor vehicles.

In such a friction clutch plate assembly one of the coaxial parts carries a friction disc provided with friction lining on each side along its periphery, the friction disc being adapted to be clamped between members fixed for rotation with a shaft, in practice the driving shaft, while the other part is fixed to a hub which is adapted to be mounted on another shaft, in practice the driven shaft.

In practice, for manufacturing convenience, the annular guiding plates are identical and are provided with passages or apertures for securing a friction disc although, in fact, only one of the annular guiding plates need by equipped with such a friction disc.

Such a friction clutch assures a controlled transmission of torque between the friction disc, which is adapted to be clamped between two members fixed for rotation with a shaft, normally the driving shaft, and the hub, which is adapted to mounted on the other shaft, normally the driven shaft, that is, to damp audible vibrations which might develop along the kinetic chain of which the driving and driven shaft are a part.

It is furthermore known to insert between the web of the hub and the annular guiding plates friction means adapted to introduce a "hysteresis" effect in the operating characteristics of the friction clutch plate assembly; this hysteresis effect results, as is known, in a difference, for a given angular displacement of the annular guiding plates relative to the web of the hub, between the torque couple transmitted from the friction disc to the hub in a first direction of relative angular displacement, commonly known as the forward direction, and the magnitude of the torque couple transmitted during relative angular displacement in the opposite direction, commonly known as the reverse direction.

It has been established, in fact, that for certain uses such a hysteresis effect contributes to a limitation of vibrations and noise generated by rotary members associated with the kinetic chain which include the driving and driven shafts between which the friction clutch concerned is interposed.

According to the operating characteristics sought, at least part of the friction means employed may come into operation for a portion only of the relative angular displacement between the annular guiding plates and the web of the hub.

At any rate, in friction clutches of the present type, the friction means in question are usually formed as friction washers interposed axially between the web of the hub and one of the annular guiding plates, at the inner periphery thereof.

For certain uses, particularly friction clutches for heavy-duty vehicles, the hysteresis effect produced with the assistance of the friction washers may be found to be inadequate.

In order to increase the hysteresis effect, one might think of either increasing the surface of the friction washers involved or increasing their axial loading, or increase the mean radius of the friction clutch on which they are located and thereby the friction couple which they produce.

Taking into account the other component parts of a friction clutch it is difficult, in practice, owing to the limited radial space available, to increase the effective surface of the friction washers employed in such a clutch.

Likewise, increasing the loading exerted axially by the friction washers is difficult, by reason of the axial space requirements of the friction clutch; moreover, the practical effects of such increases are limited: the graph representing such an increase is rapidly damped and too great a spring load against the friction disc may, in operation, lead to friction material being torn away.

In order to increase the mean radius of the friction clutch against which the friction washers are applied, it has been proposed to arrange the friction washers proximate to the outer periphery of the annular guiding plates.

Yet such an arrangement encounters difficulties which result, notably, from the necessity of providing suitable means for retaining the friction washers radially.

A general object of the present invention is to overcome this drawback, to take advantage of the apertures or passages provided in outer periphery of the annular guiding plates, with a view to, as mentioned above, fixing the friction disc to one of them, the apertures or passages of the other remaining normally free.

SUMMARY OF THE INVENTION

A more specific object of the present invention is the provision of a torsion damping assembly of the type comprising two coaxial parts mounted for limited relative angular displacement, one of said part comprising a web and the other part comprising one annular guiding plates disposed on each side of the web, cross members interconnecting the parts, a circumferential array of resilient means interposed between said parts, passages formed in said annular plates, friction means adapted to intervene between said parts for at least a portion of the sector of relative angular displacement, said friction means including at least one friction shoe secured to one of said annular plates by means of said passages.

A still more specific object of the invention is the provision of a friction clutch plate assembly comprising a hub, a web extending radially outwardly from said hub, two identical annular guiding plates, one said annular guiding plate on each side of said web, cross members interconnecting said annular plates, said annular plate being mounted for predetermined angular displacement relative to said web of said hub, a friction disc secured to a first said annular plate through passages therein and carrying friction linings at its periphery, a circumferential array of resilient means interposed between said web and said annular plates, and friction shoe means between said web and said annular plates operative over at least a portion of the limited relative angular displacement thereof, means for securing said friction shoe means through passages in a second said annular plate identical with said passages in said first annular plate.

In other words, the friction shoes employed are secured to the annular guiding plate which does not carry the friction disc, without it being necessary to provide on this annular guiding plate any particular means for this purpose, this annular guiding plate advantageously may be identical to the other annular guiding plate which bears the friction disc.

In practice both of the annular guiding plates involved may be used for carrying the friction disc or for carrying one or more friction shoes.

The manufacture of annular guiding plates advantageously remains the same notwithstanding their carrying different members.

Beyond that, the radial retention of the friction shoe(s) is thus effected by itself, that is, by the annular guiding plate which carries them.

Finally it is possible, in accordance with the invention, to adjust, as required, the hysteresis characteristics of the friction clutch plate concerned, by providing it with one or more friction shoes, or, put otherwise, construct, with a reduced number of basic parts of the same type, friction clutch plate assemblies having different hysteresis characteristics specifically adapted to their particular use.

It will, in addition, be appreciated that the peripheral friction clutch plate assemblies produces savings in materials costs.

Features and advantages of the present invention will become further apparent from the following description, given by way of example, with reference to the accompanying schematic drawings.

BRIEF DESCRIPTION OF THE DRAWINGS

FIG. 1 is a fragmentary elevational view, partly broken away, of a friction clutch plate assembly with a damping hub according to the invention;

FIG. 2 is an axial sectional view of the friction clutch plate assembly taken on the line II—II in FIG. 1;

FIG. 3 is another fragmentary axial sectional view of the assembly taken along the line III—III in FIG. 1;

FIG. 4 is an enlarged fragmentary view of the part of the assembly in the inset IV in FIG. 2;

FIG. 5 is, on a different scale, an elevational view of a support plate for one of the friction shoes employed in this assembly;

FIG. 6 is a cross-sectional view of this support plate taken along the line VI—VI in FIG. 5;

FIG. 7 is a view similar to that of FIG. 4 for an modified embodiment of a friction clutch plate assembly according to the invention; and FIG. 8 is another fragmentary axial cross section of the modified embodiment.

DETAILED DESCRIPTION OF THE PREFERRED EMBODIMENTS

According to the embodiment of the invention illustrated in FIGS. 1-6, given by way of nonlimiting example, which concerns a use of the invention in a friction clutch plate assembly, it comprises generally a hub 10 having internal splines 11 for rotational engagement with a shaft, not shown, usually driven shaft, and a web 12 extending radially outwardly from said hub.

The hub 12 (FIGS. 1-6) is sandwiched between two identical annular guiding plates 13,13' which, as shown in FIG. 2, have diameters substantially equal to that of the web of the hub 12 and are interconnected by cross members 14, in accordance with the characteristics described hereinafter.

A friction disc 15 is secured by rivets 16 to one of the annular guiding plates (viz., annular guiding plate 13) by means of passages 17 provided along the outer periphery of the annular plate 13.

The other annular guiding plate 13' being, for the sake manufacturing convenience, as mentioned above, identical to annular guiding plate 13, also has proximate to its outer periphery passages 17 but these are normally not utilized.

The friction disc 15, carried by the annular guiding plate 13, bears on each side along its periphery friction linings 18. It is thus adapted to be clamped between the plates of a clutch, not shown, which plates are in turn fixed for rotation with a shaft, generally the driving shaft.

As is known per se, a circumferential array of resilient means are interposed between the web 12 of the hub 10 and the annular guiding plates 13,13'.

In the illustrated embodiment, the resilient means comprise a plurality of coil springs 20 uniformly angularly spaced about the axis of the assembly, each said spring 20 being disposed substantially tangentially of their common circumference and being accommodated partly by an aperture 21 formed in the web 12 of the hub and partly by recesses defined by outwardly bulging stamped portions 22 in each of the annular guiding plates 13,13' facing the corresponding aperture 21.

In the illustrated embodiment the outwardly bulging portions 22 in the annular guiding plates 13,13' alternate with indented portions 23 also stamped in the annular guiding plates 13,13'; each annular guiding plate 13,13' is thus alternately deformed in one direction and then the other, to each side of the median plane thereof and along the entire corresponding circumference.

In the illustrated embodiment the radial separation between each bulging portion 22 and its associated indented portions 23 take the form of slits so that each spring 20 bears at each of its ends against the corresponding radial edge of each indented portion 23.

In the embodiment of FIGS. 1-3, the cross members or pins 14 connecting the annular guiding plates to each other are disposed along a circle smaller than the circle which is tangent to the springs 20. The cross member or pins 14 extend through the web 12 of the hub via apertures 21 provided for accommodating the springs. The cross members or pins 14 also extend through the annular guiding plates 13,13' through passages provided for this purpose therein, and they are crimped beyond the annular guiding plates.

Further, in the illustrated embodiment, the cross members or pins are flattened, that is, in their central region, between the annular guiding plates 13,13' they are of oblong rectangular section tangent to the annular guiding plates.

In any event, and in a manner known per se, the annular guiding plates 13,13' form, with the friction disc 15, fixed thereto, a rotary assembly with the web 12 of the hub against the bias of springs 20 over an angular sector of displacement determined either by total compression of the springs or by abutment of the cross members or pins 14 against the corresponding radial edge of the apertures 21 in the webs 12 of the hub through which they extend.

Likewise, in a manner known per se, between the web 12 of the hub and the annular guiding plates 13,13' there are provided friction means operative for at least part of the angular displacement of the annular guiding plates.

In the embodiment illustrated in FIGS. 1–3, and in a manner known per se, the friction means comprise a friction washer 25 disposed axially between the annular guiding plate 13 and the web 12 of the hub proximate to the inner periphery of the annular guiding plate. In practice, and as represented, the friction washer 25 is in contact with the web 12 of the hub and is urged by "Onduflex" type axial acting spring washers 26, distribution washer 27 being interposed therebetween possibly integral, e.g. by adhesive, with the friction washer 25. The distribution washer 27, in the illustrated embodiment, is fixed for rotation on the annular guiding plate 13 by tabs 28 extending through passageways 29 disposed along the inner periphery of the annular guiding plate 13.

According to the invention, additional friction means are provided, comprising at least one friction shoe 30 secured to the annular guiding plate 13' by means of passages 17 of identical configuration with those in the annular guiding plate 13.

In the embodiment illustrated there are, accordingly, three friction shoes 30 which, arranged at 120° with respect to one another, extend over a portion of the circumference along the outer periphery of the annular guiding plate 13'.

In the embodiment illustrated in FIGS. 1–6, such a friction shoe 30 comprises a mounting member 31 including, on one side dowels 32 of complementary configuration to passages 17 in the annular guiding plates 13,13' and on the other side friction pad 33. The dowels 32 of such a friction shoe 30 are inserted into an equal number of passages 17 in the annular guiding plate 13'.

In the illustrated embodiment, each friction shoe 30 thus comprises two dowels 32 angularly spaced from each other at an angle twice as great as the angular spacing between consecutive passages 17 in the annular guiding plate 13' so that a passage 17 between each two consecutive passages 17 receiving corresponding dowels of a given friction shoe is free.

Preferably, though not compulsorily, after friction shoe 30 is secured to the annular guiding plate 13' each of the dowels 32 is struck with a punch to bulge it radially thereby insuring its securement in the corresponding passage 17 in the annular guiding plate 13'.

If the friction disc 15 is rotated in the direction indicated by the arrow F in FIG. 1, the annular guiding plates 13,13' with which it is fixed for rotation through springs 20, which are compressed, the web 12 of the hub and thus the hub 10 and simultaneously friction shoes 30 contribute their friction action to that produced by the friction washer 25.

According to the modified embodiment illustrated in FIGS. 7 and 8, the annular guiding plates 13,13' have diameters greater than that of the web 12 of the hub so that the cross members or pins 14 which connect them together are disposed beyond the periphery of the web 12, i.e., along a circle whose diameter is greater than that of the circle to which the springs 20 are tangent.

In this modified embodiment the friction shoes 30 are comprised of simple friction pads secured to rivets 40 on the annular guiding plate 13' through, as previously, at least some of the passages 17 disposed proximate to the periphery of the annular guiding plate 13'.

Only the radially innermost parts of the friction shoes 30, in fact, bear against the friction disc 12.

Together with the passages for the cross members of pins each friction shoe 30 has in its central area a notch 41 such as illustrated in dotted lines in FIG. 5 and solid lines in FIG. 8.

In the illustrated embodiment of FIGS. 7 and 8, the cross members or pins 14 are cylindrical and they insure by themselves the securement of the friction disc 15 to the annular guiding plate 13.

The present invention is not limited to the illustrated and described embodiments but covers all modifications and/or combinations of their various parts.

In particular, even though in the foregoing embodiments the friction shoes complement the usual type of friction washers, this is not necessarily so, the friction shoes alone may be provided.

In any event, the number of friction shoes is a matter of design choice and together they may form a continuous annular friction washer.

Furthermore, although the invention has been particularly described with reference to a torsion damping clutch plate assembly in which the friction disc is carried by the rotatable coaxial part comprising the annular guiding plates, the web associated with the other rotatable coaxial part being integral with a corresponding hub, it goes without saying that the present invention is equally applicable where the friction disc is carried by the other rotatable coaxial part, e.g. the one which carries the web, the annular guiding plates being, in this case, integral with the hub.

Finally, the field of the invention is obviously not limited to that of friction clutches but covers all torsion damping devices including two coaxial parts rotatable with respect to each other, with resilient means such as described hereinbefore, interposed between the coaxial parts in circumferential array; the parts may, for instance, be fixed individually for movement with the shafts to be coupled together.

What is claimed is:

1. A friction clutch plate assembly comprising a hub, a web extending radially outwardly from said hub, two identical annular guiding plates, one said annular guiding plate on each side of said web, cross members interconnecting said annular plates, said annular plates being mounted for predetermined angular displacement relative to said web of said hub, a friction disc secured to a first of said annular plates through a plurality of passages at the outer periphery thereof and carrying friction linings at its periphery, a circumferential array of resilient means interposed between said web and said annular plates, and friction shoe means disposed between said web and the other of said annular plates being operative over at least a portion of the limited relative angular displacement thereof, means for securing said friction shoe means through passages in said other annular plate which are identical with said plurality of passages in said first annular plate.

2. An assembly according to claim 1, wherein said means for securing said friction shoe means through said passage in said second annular plate comprises dowels on one side of a support plate for said friction shoe means, said dowels being shaped and arranged to engage said passages in said second annular plate, friction lining being provided on the other side of said support plate for said friction shoe means.

3. An assembly according to claim 1, wherein said friction lining is secured directly to said other annular plate through said passages therein.

4. An assembly according to claim 3, wherein said means for securing said friction shoe means to said other annular plate comprises rivets.

5. An assembly according to claim 1, wherein said friction shoe means has a notch for passage of one of said cross member therethrough.

6. An assembly according to claim 1, wherein there are a plurality of said friction shoes disposed in an annular arrangement.

7. An assembly according to claim 6, wherein said friction shoes are disposed in a continuous annular arrangement.

8. A friction clutch plate assembly comprising a hub, a web extending radially outwardly from said hub, two identical annular guiding plates, one of said annular plates being disposed on each side of said web, cross members interconnecting said annular plates, means mounting said annular plates for predetermined angular displacement relative to said web of said hub, a friction disc secured to a first of said annular plates through a plurality of passages at the outer periphery thereof, said friction disc carrying friction lining at its outer periphery, a circumferential array of resilient means interposed between said web and said annular plates, a corresponding plurality of passages in the other of said guide plates in registry with said plurality of passages in said first annular plate for accommodating friction shoes, each friction shoe comprising a mounting member having dowels projecting generally axially from one side thereof, each said dowel being inserted and secured in one of said plurality of passages in said other annular plate, and a friction pad fixed on the other side of said mounting member facing and in frictional engagement with an opposed radial surface of said web, said friction shoes being operative over at least a portion of the limited relative angular displacement of said angular plates.

9. An assembly according to claim 8, wherein said friction pads are of part annular configuration, the radial dimension of said friction pads being substantially equal to that of the corresponding mounting members.

10. An assembly according to claim 9, wherein there is a depression on the mounting members opposite said dowels, and said friction pads overlying said depression.

11. An assembly according to claim 9, wherein said dowels are force-fitted in their corresponding passages.

12. An assembly according to claim 8, wherein said dowels are stamped portions in said mounting members.

* * * * *